I. A. KIDD.
PIPE CLAMP.
APPLICATION FILED OCT. 31, 1916.
1,241,126.
Patented Sept. 25, 1917.
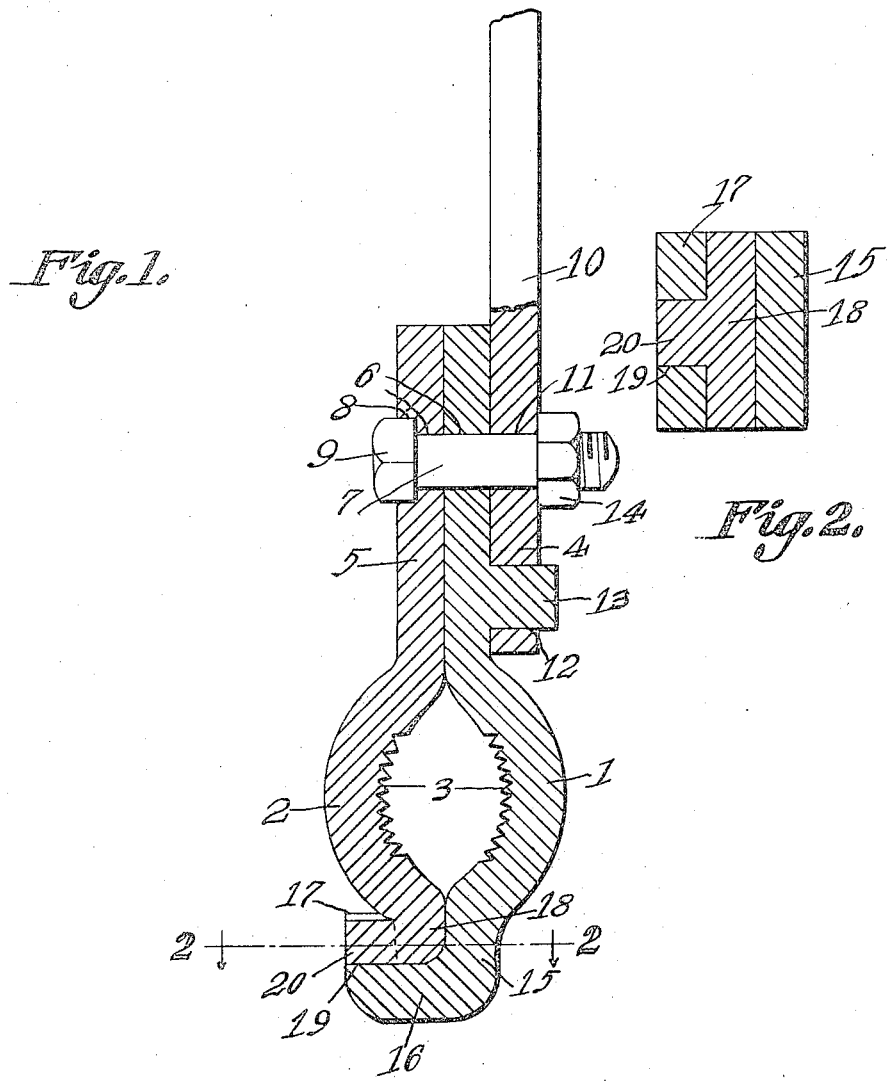

UNITED STATES PATENT OFFICE.

IRVIN A. KIDD, OF SALISBURY, NORTH CAROLINA, ASSIGNOR OF ONE-HALF TO THOMAS HENRY KRITZER, OF SPENCER, NORTH CAROLINA.

PIPE-CLAMP.

1,241,126.  Specification of Letters Patent.  Patented Sept. 25, 1917.

Application filed October 31, 1916. Serial No. 128,787.

*To all whom it may concern:*

Be it known that I, IRVIN A. KIDD, a citizen of the United States, residing at Salisbury, in the county of Rowan and State of North Carolina, have invented a new and useful Pipe-Clamp, of which the following is a specification.

The present invention appertains to pipe clamps, and aims to provide a novel and improved pipe clamp which is extremely simple in construction, utilizing a minimum amount of material, but which is nevertheless thoroughly efficient and practical in use, the device being adapted particularly for use in supporting the sand pipe of a locomotive, although it can be used for various other purposes.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a median section of the clamp.

Fig. 2 is a cross section on the line 2—2 of Fig. 1.

The clamp is composed of two bar-like clamp members which can be of cast or malleable iron, or other suitable material, and the two elongated clamp members are provided between their ends with curved jaws 1 and 2 having their concaved sides facing one another and toothed, as at 3, to grip the pipe. Straight flat shanks 4 and 5 project from certain ends of the jaws 1 and 2 and are relatively long and adapted to bear snugly one against the other. The shanks 4 and 5 are provided with registering apertures 6 near their ends, for receiving a clamping bolt 7, and the shank 5 is provided with a recess 8 in its outer face at the outer end of its aperture 6 for receiving the head 9 of the bolt.

In order to support the clamp, a supporting bar or member 10 is provided, the shank 4 resting snugly against the terminal of said bar in overlapping relation, and the bar 10 has an aperture 11 registering with the aperture 6 and also receiving the bolt 7, a nut 14 being threaded upon said bolt and bearing against the bar 10 to clamp the shanks 4 and 5 together and hold them rigidly against the supporting bar 10. Said bar is further provided with an aperture 12 receiving a stud 13 outstanding from the shank 4 between its aperture 6 and the jaw 1, which prevents the accidental rotation or displacement of the clamp relative to its support.

As a simple and effective means for locking the other ends of the jaws 1 and 2 together, to prevent the separation of the jaws, that end of the jaw 1 remote from the shank 4 is provided with a portion 15 projecting therefrom in alinement with the shank 4, and said portion 15 has a portion 16 extending at right angles therefrom toward that side at which the jaw 2 is located. The portion 16 is provided with a lip 17 extending at right angles therefrom toward the jaw 2, and the portions 15 and 16 and lip 17 provide a hook carried by the end of the jaw 1, for snugly receiving the lip 18 which projects from the respective end of the jaw 2 in alinement with the shank 1. The lip 17 is provided between its ends with a recess or notch 19 for snugly receiving a lug 20 projecting outwardly from the lip 18. Thus, when the clamp members are assembled, the lip 18 can be inserted into the hook 15—16—17 of the jaw 1, and the lug 20 moved into the recess 19, which will lock the ends of the jaws 1 and 2 together. The lip 18 in fitting between the portion 15 and lip 17 will prevent the jaws from separating, and the lug 20 in fitting in the recess or notch 19, will prevent the clamp members from swinging relative to one another about the bolt 7 as a pivot.

Having thus described the invention, what is claimed as new is:

1. A clamp embodying a pair of clamp members having coöperating jaws and shanks extending from certain ends thereof to bear against one another, said shanks having registering apertures for the reception of a bolt to clamp them against a support, and one shank having an outstanding stud to enter an aperture in said support.

2. A clamp embodying a pair of clamp members having coöperating jaws and shanks extending from certain ends thereof to bear against one another, said shanks having registering apertures for the reception of a bolt to clamp them against a support, and one shank having an outstanding stud between its aperture and the respective jaw to enter an aperture in the support.

3. A clamp embodying a pair of clamp members having coöperating jaws, shanks projecting from certain ends of the jaws and adapted to bear against one another, a portion projecting from the other end of one jaw, a portion extending at an angle from said portion, a lip extending at an angle from the second mentioned portion toward the other jaw and having a notch, a lip extending from the other end of the last mentioned jaw to fit snugly between the aforesaid lip and first mentioned portion, the second mentioned lip having an outstanding lug to fit snugly in said notch.

In testimony that I claim the foregoing as my own, I have hereto affixed my signature in the presence of two witnesses.

IRVIN A. KIDD.

Witnesses:
LEE C. MOCK,
E. H. CLAPP.

Copies of this patent may be obtained for five cents each, by addressing the "Commissioner of Patents, Washington, D. C."